US007567656B2

(12) United States Patent
Yoshitani

(10) Patent No.: US 7,567,656 B2
(45) Date of Patent: Jul. 28, 2009

(54) TELEPHONE COMMUNICATION APPARATUS

(75) Inventor: Norifumi Yoshitani, Nabari (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 0 days.

(21) Appl. No.: 11/929,784

(22) Filed: Oct. 30, 2007

(65) Prior Publication Data

US 2008/0075272 A1    Mar. 27, 2008

Related U.S. Application Data

(62) Division of application No. 10/391,652, filed on Mar. 20, 2003, now Pat. No. 7,308,086.

(30) Foreign Application Priority Data

Mar. 20, 2002    (JP)    ............................ P2002-079445

(51) Int. Cl.
*H04M 11/00*    (2006.01)
*H04M 1/00*    (2006.01)
*H04Q 7/20*    (2006.01)

(52) U.S. Cl. .................... 379/93.09; 379/156; 379/165; 455/462; 455/464

(58) Field of Classification Search .............. 379/93.04, 379/93.07, 94.14, 156, 165, 171, 177, 185, 379/198, 199, 211.01, 215.01, 209.01; 455/462, 455/464

See application file for complete search history.

(56) References Cited

U.S. PATENT DOCUMENTS

| 4,125,748 | A | * | 11/1978 | Nahabedian et al. | ........ 379/158 |
| 4,768,218 | A | * | 8/1988 | Yorita | ......................... 455/463 |
| 4,817,132 | A | | 3/1989 | Chamberlin et al. | |
| 5,239,572 | A | | 8/1993 | Saegusa et al. | |
| 5,555,258 | A | | 9/1996 | Snelling et al. | |
| 5,602,910 | A | | 2/1997 | Tsutsui et al. | |
| 5,805,582 | A | * | 9/1998 | Snelling et al. | ............. 370/337 |
| 5,809,111 | A | | 9/1998 | Matthews | |
| 5,841,851 | A | | 11/1998 | Recht et al. | |
| 5,878,123 | A | * | 3/1999 | Boakes | .................. 379/142.07 |

(Continued)

FOREIGN PATENT DOCUMENTS

JP    2-24664    2/1990

(Continued)

*Primary Examiner*—Binh K Tieu
(74) *Attorney, Agent, or Firm*—Birch, Stewart, Kolasch & Birch, LLP

(57) ABSTRACT

A cordless slave apparatus is connected to a host apparatus connected to lines via wireless communications. When the cordless slave apparatus is picked up from a charging apparatus to respond to a call from any of the lines, if the line at which the call has arrived has been selected by the cordless slave apparatus, the line is connected immediately and communications can start. If the line is not selected by the cordless slave apparatus, when a connection instruction from the user is provided, the line is connected and communications can start. When calls have arrived from lines simultaneously, communications can start by capturing a line according to a connection instruction. When a call from another line has arrived during communications, the lines are switched according to a switching instruction from the user and the line through which the communications have been performed is automatically turned to be on hold.

2 Claims, 7 Drawing Sheets

U.S. PATENT DOCUMENTS

| | | |
|---|---|---|
| 5,903,643 A | 5/1999 | Bruhnke |
| 5,937,046 A | 8/1999 | Lee |
| 5,974,043 A | 10/1999 | Solomon |
| 6,167,262 A | 12/2000 | Tanigawa |
| 6,636,595 B1 | 10/2003 | Core |
| 6,674,842 B2 | 1/2004 | Weinman, Jr. |
| 6,801,609 B2 | 10/2004 | Fullarton et al. |
| 7,139,585 B2 | 11/2006 | Hachimura et al. |
| 2001/0012349 A1 | 8/2001 | Karnowski |
| 2003/0059001 A1 | 3/2003 | Meyerson et al. |
| 2005/0041632 A1 | 2/2005 | Takahashi |

FOREIGN PATENT DOCUMENTS

| | | |
|---|---|---|
| JP | 5-30253 | 2/1993 |
| JP | 5-336339 | 12/1993 |
| JP | 6-164760 | 6/1994 |
| JP | 9-200319 | 7/1997 |
| JP | 11-284722 | 10/1999 |

* cited by examiner

```
  LINE1
≫ LINE2
```

↓

CALL ARRIVES AT LINE 1

(ARROW INDICATING CHOICE (≫)
 AUTOMATICALLY MOVES WHEN CALL ARRIVES)

↓

(b)

```
≫ LINE1  RING
  LINE2
```

→ PRESS TALK KEY FOR COMMUNICATIONS (c)

```
≫ LINE1  TALK
  LINE2
```

RINGING TONE OF
A CALL STOPS

↓

COMMUNICATIONS ARE
FINISHED AND LINE
IS DISCONNECTED

↓

(d)

```
  LINE1
≫ LINE2
```

(e)

```
≫ LINE1
  LINE2
```

TELEPHONE COMMUNICATION APPARATUS

This application is a Divisional of application Ser. No. 10/391,652, filed on Mar. 20, 2003, now U.S. Pat. No. 7,308,086 the entire contents of which are hereby incorporated by reference and for which priority is claimed under 35 U.S.C. § 120.

BACKGROUND OF THE INVENTION

1. Field of the Invention

The invention relates to a telephone communication apparatus that can be connected to communication paths of a plurality of communication lines and through which information in the form of speeches, images and data of a telephone, a facsimile apparatus or the like are transmitted or transmitted for speech communications. More specifically, the invention relates to connection of a cordless slave apparatus having a quick communication function, processing when communication requests are made from a plurality of lines, and processing when a communication request is made to another line during speech communications in telephone communications in which a plurality of lines are connected.

2. Description of the Related Art

Conventionally, some of telephone communication apparatus such as telephones or facsimile apparatuses can be connected to communication paths of a plurality of communication lines and are provided with a conversation reservation function. For example, Japanese Unexamined Patent Publication JP-A 5-30253 (1993) discloses a technique regarding a facsimile apparatus with a telephone function that is connected to a plurality of lines, in which a connection to an unused communication apparatus is established so as to deal with a conversation reservation request of the facsimile apparatus even when the telephone function is in use. Moreover, Japanese Unexamined Patent Publication JP-A 5-336339 (1993) discloses a technique regarding a facsimile apparatus having a plurality of lines, in which a conversation reservation request that occurs during communications is processed appropriately. A conversation reservation request detecting portion detects a conversation reservation request from a signal received at a line control portion, and lets a busy line determining portion determine the use status of a telephone. In the case where the telephone is in use, the occurrence of the conversation reservation request is stored in a conversation reservation hold storage portion. A display screen in an operating portion and the telephone are notified of the occurrence of the conversation reservation request. A conversation reservation instructing portion outputs a conversation reservation instruction when the line becomes idle. A conversation reservation executing portion executes the instruction requesting the conversation reservation.

Regarding the communication paths of a plurality of lines, in addition to the conversation reservation function, Japanese Unexamined Utility Model Publication JP-U 2-24664 (1990) discloses a technique regarding a facsimile apparatus that is connected to a plurality of communication lines, in which when call-arrival detecting means detects that a call has arrived from another communication line while facsimile communications through a communication line are ongoing, and when means for determining the priority of the two communication lines determines that the communication line at which the new call has arrived takes priority over the communication line of the ongoing facsimile communications, then a line switching portion switches a modem portion to be connected to a network control portion on the side of a priority communication circuit and starts execution of a transmission control procedure with respect to the side of the priority communication line.

Japanese Unexamined Patent Publication JP-A 6-164760 (1994) discloses a technique regarding a facsimile apparatus that can automatically select a line to be used from a plurality of lines and recognize the selected line to be used easily at anytime during operation. When a line selection control portion is in an automatic line selection mode, it determines whether or not there is an unused line among the lines of a type with high priority. In the case where there is an unused line, a line of the type with high priority (ISDN) is selected. On the other hand, in the case where there is no unused line, it is determined whether or not there is an unused line among the lines of a type with low priority. In the case where there is an unused line, a line to be used is selected from the lines of this type (analog lines). In the case where there is no unused line among the lines of either type, a reservation for transmission with a line of the type with high priority is made. A line identification information output portion outputs identification information on the line to be used such as the number or the name, and the information is displayed on a display portion.

Japanese Unexamined Patent Publication JP-A 9-200319 (1997) discloses the following technique: in order to respond to a call from a particular caller without fail when a plurality of connected lines receive calls at the same time, when the number that matches the received caller number is registered as a one-touch dial, then an LED indicator for indicating a state is made flash, corresponding to the one-touch dial button, to indicate that the call is being received. In particular, in the case of a digital line such as an ISDN line, when two calls using two channels are received at the same time, a user can recognize the callers to know which should be answered first and respond to the call from the caller to be communicated with first without fail, irrespective of the order of receiving the calls.

Japanese Unexamined Patent Publication JP-A 11-284722 (1999) discloses a technique for a telephone with a plurality of lines, in which a message recording function and an ID display function are utilized sufficiently when one telephone line is busy and a call is received in another line. The telephone according to this technique includes a recording and memory portion, an operation portion, and a portion for displaying ID data obtained from a data demodulator. When one line is busy and a call is received at the other line, a main control portion set one mode selected by the operation of the operation portion from a plurality of function modes including a first function mode in which the other line is connected to the recording and memory portion to record a message and a second function mode in which an on-hold message is supplied to the other line.

In the techniques disclosed in JP-A 5-30253 and JP-A 5-336339, a request for conversation after the image transmission of the facsimile apparatus is dealt with appropriately by using a communication apparatus that is not in use, or by indicating that there is a conversation request to the user who is on the phone. The technique disclosed in JP-U 2-24664 defines a procedure in the case where a call is received in another line during communications. Moreover, the technique disclosed in JP-A 6-164760 shows a method for selecting a more convenient line by selecting the type of the line at the time of making a call. In the technique disclosed in JP-A 9-200319, when a call from a caller who is registered as a one-touch dial is received in a communication apparatus having a plurality of lines, the user is notified of the call by lighting the button of this one-touch dial. In the technique disclosed in JP-A 11-284722, when a call is received at another line during communications, for example, recording is switched according to an instruction of the user.

Conventionally, telephones and facsimile apparatuses with one or a plurality of cordless slave apparatuses also have been employed. The cordless slave apparatus operates using a battery as a power source and waits while being mounted on a charging apparatus when it is not in use for communications. Some of the telephone communication apparatus with cordless slave apparatuses have a quick communication function of allowing communications by setting a communication path immediately after the cordless slave apparatus is picked up from the charging apparatus. With the quick communication function, when the cordless slave apparatus is picked up from the charging apparatus, the slave apparatus is connected to the communication path immediately and can start communications, which is as convenient as in the case where when a handset is picked up from a main body of the telephone communication apparatus, the handset is turned to be in an off-hook state and can start communications.

Connecting a plurality of lines to a telephone communication apparatus is highly useful. For example, it becomes possible to perform simultaneously speech communications and image transmission or sending and receiving images with a facsimile apparatus. Also in the telephone, when the telephone can be connected to a plurality of cordless slave apparatuses, then simultaneous connections of a plurality of slave apparatuses or the main body and the slave apparatus to external lines become possible in addition to communications between the slave apparatuses, so that it becomes possible to utilize the functions of the telephone sufficiently. Alternatively, connecting, for example, a plurality of telephones to a plurality of lines makes it possible to decrease the busy states of the line or to respond to a plurality of calls simultaneously, so that the telephones and the lines can be used efficiently.

As described above, in such cases where the telephone that is connected to a plurality of lines is provided with the quick communication function, and where calls are received from a plurality of lines, it is necessary to set the procedure for speech communications. This is because when connected to a plurality of lines, the quick communication cannot be realized in reality, unless a line to be connected to can be determined quickly when a cordless slave apparatus is picked up from the charging apparatus.

Moreover, in the case where one line is busy for communications and another line receives a communication request, it is also necessary to switch lines in response to this communication request, and to simplify the processing of the line that has been busy at the time of switching, in order to efficiently utilize, for example, a telephone that is connected to a plurality of lines.

However, processing regarding quick communications in the case of a plurality of lines and an idea of automatically holding on the previous communications at the time of switching the communications, for example, in a telephone apparatus with a plurality of lines are not disclosed in any of the techniques described above.

SUMMARY OF THE INVENTION

It is an object of the invention to provide a telephone communication apparatus that can appropriately respond to a plurality of calls by using a plurality of connectable lines efficiently.

In order to solve the problems, a line to be selected is set for each communication unit (the communication units as referred to herein include a unit for inputting/outputting signals other than speeches such as a facsimile sending/receiving unit) from a plurality of lines, and means for responding to a call signal is determined in accordance with the settings. Thus, the line that is to be used by priority is assigned to each of the communication units, and when capturing a line, a call can be answered in accordance with the convenience of each communication unit.

Furthermore, when a communication request is made from another line during communications, the lines are switched according to a request of the user and the line through which the previous communications have been performed is automatically turned to be in an on-hold state.

To realize these solutions, a method for capturing a line in response to a communication request in the case where a telephone communication apparatus, such as a facsimile apparatus, a telephone and an information processing apparatus having a communication function, that is connected to a plurality of communication lines and to which a cordless slave apparatus having a quick communication function is connected receives the communication requests from a plurality of lines, is standardized. A selected line is assigned to each terminal unit that performs communications, and a call from the selected line and calls from the other lines are processed in a different manner in terms of capturing lines. Furthermore, also a processing method in the case where a communication request is made from another line during conversation is defined, so that a method for using a plurality of lines efficiently is provided.

The invention provides a telephone communication apparatus that can be connected to communication paths of a plurality of lines, comprising a host apparatus and a cordless slave apparatus, wherein the cordless slave apparatus can be charged for a power source for operation by being mounted on a charging apparatus, and includes pick-up notification means for detecting whether or not the cordless slave apparatus is mounted on the charging apparatus and providing a notification to the host apparatus when detecting that the cordless slave apparatus is picked up from the charging apparatus, and the host apparatus includes, communication means that can perform communications by switching the communication paths of a plurality of lines;

selection means for selecting a line for each cordless slave apparatus; and quick communication means for immediately setting a communication path between a line at which a call has arrived and the cordless slave apparatus via the communication means, when notified from the pick-up notification means of the fact that the cordless slave apparatus is picked up from the charging apparatus in response to a ringing tone that occurs upon arrival of a call from any one of the communication paths, and when the line at which the call has arrived is selected for the picked-up cordless slave apparatus by the selection means.

According to the invention, when the cordless slave apparatus is picked up from a charging apparatus, the pick-up is detected by pick-up notification means of the cordless slave apparatus and the host apparatus is notified of the pick-up. The host apparatus is provided with quick communication means by which, when notified from the pick-up notification means of the fact that the cordless slave apparatus is picked up in response to a ringing tone that occurs upon arrival of a call from any one of communication paths, and when the line at which the call has arrived is selected for the picked-up cordless slave apparatus by the selection means, the communication path between the line and the cordless slave apparatus via the communication means is set immediately, so that a quick communication function for the cordless slave apparatus can be realized with respect to a plurality of lines, and therefore it is possible to appropriately answer to a plurality of calls by using a plurality of connectable lines efficiently.

Connecting a plurality of lines to the telephone communication apparatus can improve its usefulness. Also in the telephone, when the telephone can be connected to a plurality of cordless slave apparatuses, simultaneous connections of the host apparatus and the slave apparatus or a plurality of slave apparatuses to external lines become possible, in addition to communications between the slave apparatuses, so that the functions of the telephone can be fully utilized. Alternatively, connecting, for example, a plurality of telephones to a plurality of lines makes it possible to decrease the busy states of the line and to respond to a plurality of calls simultaneously, so that the telephones and the lines can be used efficiently.

As described above, for quick communications or in the case where calls from a plurality of lines occur, for example, in the telephone connected to the plurality of lines, it is necessary to set the procedure for communications.

To solve this problem, a line to be selected is set for each communication unit from the plurality of lines, and means for responding to a call is determined in accordance with the settings. Thus, the line that is to be used by priority is assigned to each of the communication units, and when capturing a line, a call can be answered in accordance with the convenience of each communication unit.

According to the invention, when the cordless slave apparatus is picked up from the charging apparatus in response to the ringing tone that occurs upon the arrival of a call from any of the lines, and when the line at which the call has arrived is selected for the cordless slave apparatus that is picked up, then the communication path between the line and the cordless slave apparatus is set immediately, so that the quick communication function for the cordless slave apparatus can be realized with respect to a plurality of lines, and therefore it is possible to appropriately respond to a plurality of calls by using a plurality of connectable lines efficiently.

In the invention it is preferable that, when the line at which a call has arrived is not selected corresponding to the cordless slave apparatus that is picked up from the charging apparatus by the selection means, the quick communication means indicates the line to which the communication request is made to a user via the cordless slave apparatus without setting the communication path between the line and the cordless slave apparatus and connects the line to the cordless slave apparatus after an instruction for connection is input from the user.

According to the invention, when a user picks up a cordless slave apparatus that has not selected the line at which the call has arrived from the charging apparatus, the line to which a communication request is made is indicated to the user, and the line is connected to the cordless slave apparatus after an instruction for connection is input from the user. Thus, the connection can be performed in accordance with the determination by the user.

Moreover, according to the invention, when the user picks up a cordless slave apparatus that does not select the line at which the call has arrived from the charging apparatus, the connection can be performed in accordance with the determination by the user.

In the invention it is preferable that, in a case where calls have arrived from a plurality of lines including the line that has been selected corresponding to the cordless slave apparatus by the selection means, when the line at which the call has arrived is the line that has been selected, the quick communication means immediately captures the line that has been selected, whereas, when the line at which the calls have arrived is not the line that has been selected, the quick communication means indicates the line at which the call has arrived to the user via the cordless slave apparatus without capturing the line that are not selected, and selects a line to be captured according to an instruction after the instruction is input from the user.

According to the invention, when the user picks up the cordless slave apparatus that has selected the line at which the call has arrived from the charging apparatus, the line is immediately captured with the quick communication function and communications become possible, whereas when either of a plurality of lines at which the calls have arrived is not selected by the cordless slave apparatus that is picked up from the charging apparatus by the user, a line is captured in accordance with an instruction from the user, so that the line can be selected in accordance with the determination by the user.

Moreover, according to the invention, in the case where the line at which the call has arrived has been selected for the cordless slave apparatus, when the user picks up the cordless slave apparatus from the charging apparatus, the line is immediately captured by the quick communication function, and in the case where either of a plurality of lines at which the calls have arrived has not been selected, the line can be selected in accordance with the determination by the user.

In the invention it is preferable that the selection means assigns a line to be selected in advance to each of the host apparatus and the cordless slave apparatuses.

According to the invention, the selection means can automatically assigns the line to be selected in advance to each of the host apparatus and the cordless slave apparatuses.

Moreover, according to the invention, a line can be automatically assigned to each of the host apparatus and the cordless slave apparatuses.

In the invention it is preferable that the selection means selects a line for the host apparatus and the cordless slave apparatuses in accordance with an instruction input from the user.

According to the invention, the line to be selected can be assigned to each of the host apparatus and the cordless slave apparatuses, in accordance with the instruction of the user.

Moreover, according to the invention, the line can be assigned to each of the host apparatus and the cordless slave apparatuses in accordance with the instruction of the user.

In the invention it is preferable that the selection means selects a line that was used for the latest communications before arrival of the call for the cordless slave apparatus.

According to the invention, the line that was used for the latest communications before arrival of the call is selected for the cordless slave apparatus, so that when the cordless slave apparatus does not respond to the call, it can continue to select this line, and when the cordless slave apparatus responds to the call, the line selection can be switched to a new line.

Moreover, according to the invention, even when the call has arrived, in the case where the cordless slave apparatus does not respond to the call, it can continue the previous line selection state, and in the case where the cordless slave apparatus responds to the call, the line selection can be switched.

In the invention it is preferable that the selection means can switch a manner of the selection of the line in accordance with input of an instruction from a user, the manner is selected from among:

assigning a line to be selected in advance to each of the host apparatus and the cordless slave apparatuses;

selecting a line for the host apparatus and the cordless slave apparatuses in accordance with an instruction input from a user; and selecting a line that was used for the latest communications before arrival of the call for the cordless slave apparatus.

According to the invention, the user can switch the manner of the selection of the line for the host apparatus or the cordless slave apparatuses, so that it is possible to select an appropriate manner depending on, for example, the use status of the telephone communication apparatus.

Moreover, according to the invention, the user can switch the manner of the selection of the line for the host apparatus or the cordless slave apparatuses depending on, for example, the use status of the telephone communication apparatus.

Further, the invention provides a telephone communication apparatus that can be connected to communication paths of a plurality of lines, comprising:

communication means that can perform communications by switching the communication paths of the plurality of lines;

request detection means for detecting whether or not a communication request is made to another line during communications that are performed by the communication means via any of the lines; and line switching means for notifying a user of detection of the communication request when the communication request from another line is detected by the request detection means and for switching the line of the communication means in accordance with an instruction for switching the line when the instruction is input from the user.

According to the invention, the telephone communication apparatus that can be connected to communication paths of the plurality of lines comprises the communication means that can perform communications by switching the communication paths of the plurality of lines, the request detection means for detecting whether or not a communication request is made to another line during communications that are performed by the communication means via any of the lines, and the line switching means for notifying the user of detection of the communication request when the communication request from another line is detected by the request detection means and for switching the line of the communication means in accordance with the instruction for switching the line when the instruction is input from the user. The line switching means notifies the user of detection of the communication request when the communication request from another line is detected by the request detection means, and switches the line of the communication means in accordance with the instruction for switching the line when the instruction is input from the user. Thus, it is possible to appropriately respond to a plurality of calls by using the plurality of connectable lines efficiently.

Furthermore, according to the invention, in the telephone communication apparatus that can be connected to the communication paths of a plurality of lines, when the communication request is made from another line during communications that are performed via any one of the lines, the communication request is detected and the user is notified of the request, and when an instruction for switching the line is input, the line is switched. Thus, it is possible to appropriately respond to a plurality of calls by using the plurality of connectable lines effectively.

In the invention it is preferable that the line switching means turns a line through which communications via the communication means have been performed before the switching of the line, to be in an on-hold state.

According to the invention, at the time of switching the line during communications, the line through which communications have been performed before the switching is turned to be in the on-hold state, so that the user does not have to perform an operation for turning the line to be in the on-hold state and a shift to the on-hold state associated with the switching can be performed automatically.

Moreover, according to the invention, the line through which communications have been performed before the switching is turned to be in the on-hold state to respond to the communication request from another line, so that it is unnecessary to perform the operation for turning the line through which the communications have been performed to be in the on-hold state and the shift to the on-hold state, can be performed automatically.

In the invention it is preferable that the communication paths of the plurality of lines include a communication line formed by superimposing a high-frequency signal on a telephone line.

According to the invention, it is possible to connect a plurality of lines via an existing telephone line using Home-PNA method that is used for a communication path for a home information communication network by superimposing a high-frequency signal on the existing telephone line.

Moreover, according to the invention, it is possible to connect the plurality of lines by superimposing a high-frequency signal on the existing telephone line.

In the invention it is preferable that the communication paths of the plurality of lines include a communication line through which wireless communications are performed.

According to the invention, it is possible to connect the plurality of lines via wireless communications, using a communication line through which wireless communications are performed, such as a Bluetooth line.

Moreover, according to the invention, it is possible to connect the plurality of lines via wireless communications.

BRIEF DESCRIPTION OF THE DRAWINGS

Other and further objects, features, and advantages of the invention will be more explicit from the following detailed description taken with reference to the drawings wherein:

FIG. 7 is a diagram illustrating a concept for selecting a line as another embodiment of the invention.

DETAILED DESCRIPTION OF THE PREFERRED EMBODIMENTS

Figure 1A:
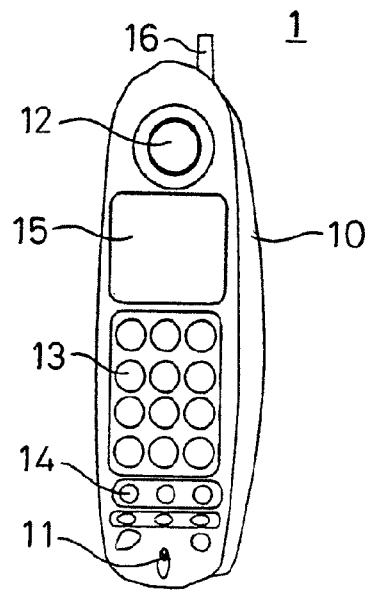
FIGS. 1A to 1C are views showing the exteriors of a cordless slave apparatus and a host apparatus of a telephone communication apparatus of an embodiment of the invention.

Now referring to the drawings, preferred embodiments of the invention are described below.

The invention is applied to all information processing apparatus and communication apparatus that are connected to a plurality of lines among telephones, facsimile apparatuses and the like. Herein, a telephone apparatus with a cordless slave apparatus will be described as an example.

Figure 1B:
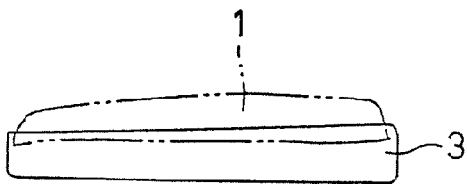
Figure 1C:
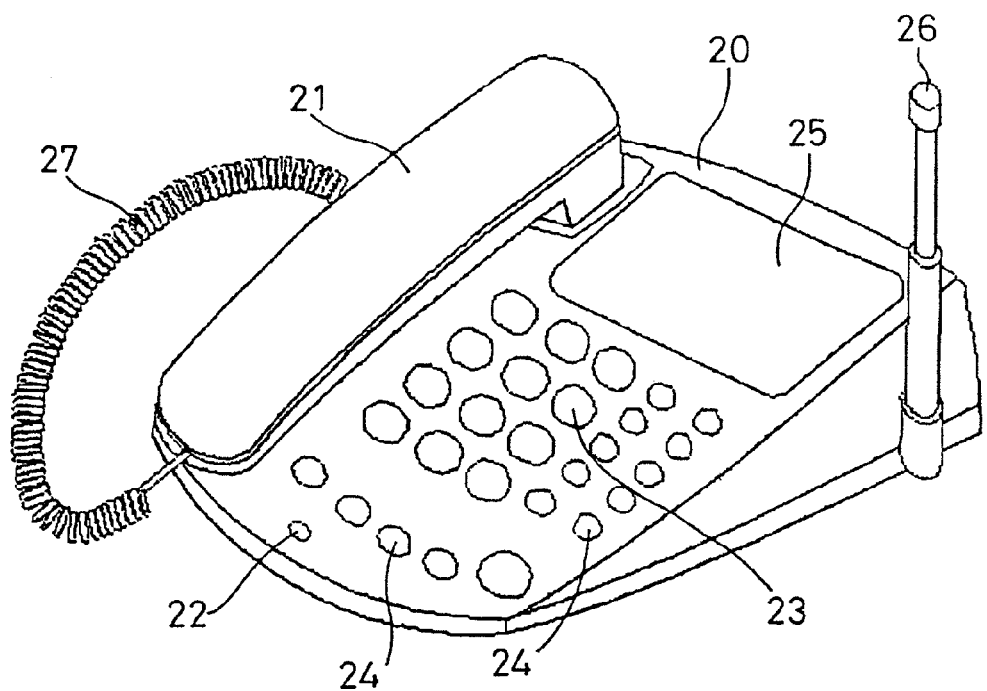

FIGS. 1A to 1C show the exterior configurations of a cordless slave apparatus 1 in FIGS. 1A and 1B and a host apparatus 2 in FIG. 1C, respectively, as a telephone communication apparatus of an embodiment of the invention. FIG. 1B shows the state where the cordless slave apparatus 1 is being mounted on a charging apparatus 3 to be charged, indicating by an imaginary line. As shown by solid lines in FIG. 1C, the cordless slave apparatus 1 includes a microphone 11 for sending speech, a speaker 12 for receiving speech communications, dial keys 13 for inputting, for example, telephone numbers, operation keys 14 for inputting various instructions, a display apparatus 15 for displaying various information, an antenna 16 and the like in a housing 10. As shown in FIG. 1C, the host apparatus 2 includes a handset 21 for sending/receiving speech communications, a microphone 22 for sending speech communications, dial keys 23 for inputting, for example, telephone numbers, operation keys 24 for inputting various instructions, a display apparatus 25 for displaying various information, an antenna 36, a curled cord 27 for connecting the handset 21 and the like in a housing 20.

Figure 2:
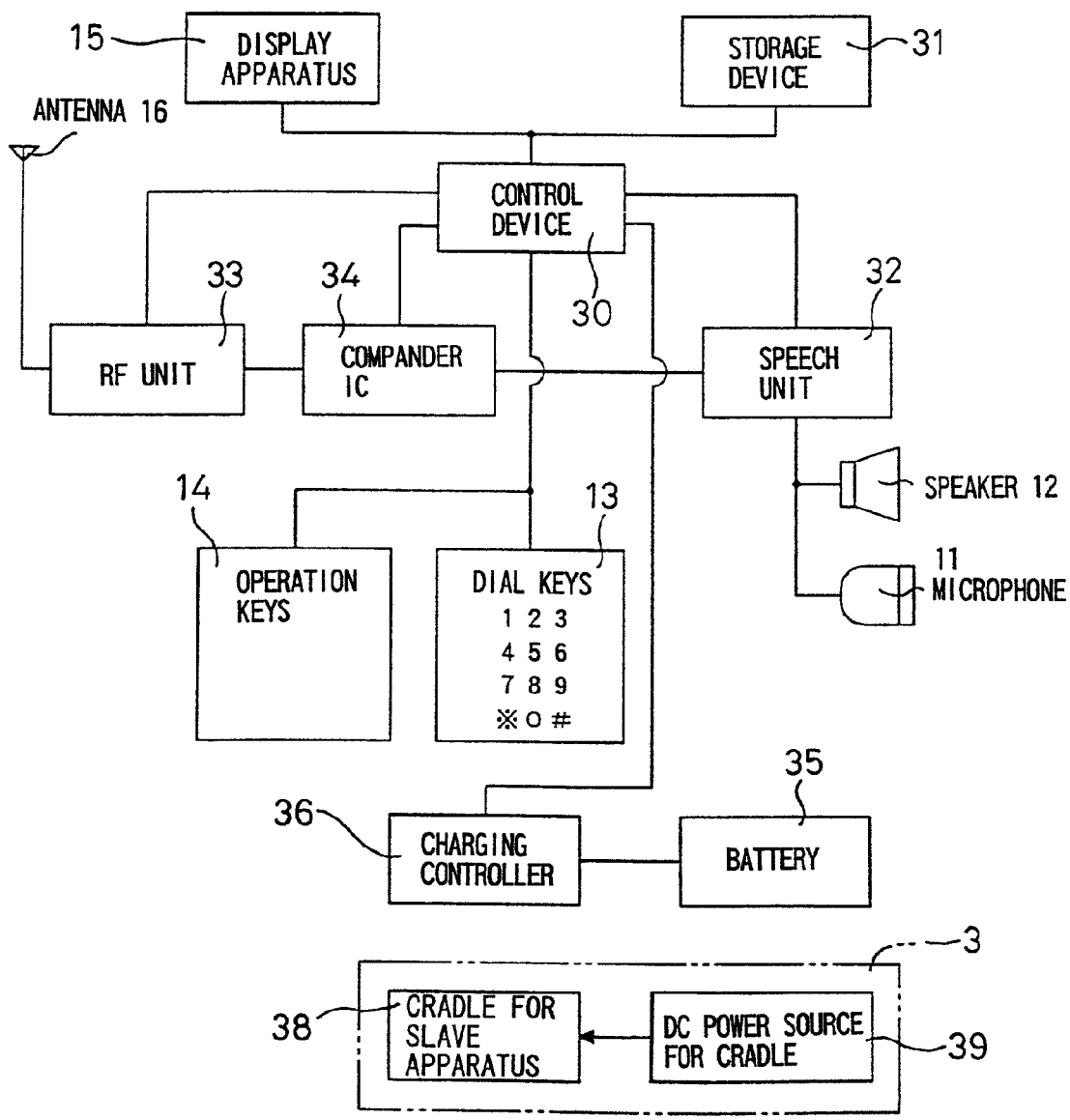
FIG. 2 is a block diagram schematically showing an electrical configuration of the cordless slave apparatus in FIG. 1A.

FIG. 2 schematically shows the electrical configuration of the cordless slave apparatus 1 shown in FIG. 1A. For each unit constituting the cordless slave apparatus 1, a small unit is employed because the housing 10 should be small. Although the host apparatus 2 is connected to a plurality of telephone line networks, the cordless slave apparatus 1 is not provided with a unit for connecting to the telephone line networks and performs only wireless communications with a main body of the telephone apparatus as the host apparatus 2. The slave apparatus 1 performs communications with external communication apparatuses through the telephone line networks via the host apparatus 2.

In addition to the microphone 11, the speaker 12, the dial keys 13, the operation keys 14, the display apparatus 15 and the antenna 16, the cordless slave apparatus 1 includes a control device 30, a storage device 31, a speech unit 32, a RF unit 33, a compander IC 34, a battery 35, a charging controller 36 and the like. The charging apparatus 3 includes a cradle 38 for the slave apparatus and a DC power source 39 for the cradle.

The RF unit 33 is a unit mainly constituting by a tuner, for sending/receiving radio waves that are modulated by speech signals and control signals via the antenna 16. The compander IC 34 is a circuit for compressing the speech signals that are to be transmitted to be a non-linear type so as to allow clear conversations speech within the range of a frequency band, irrespective of the volume of the speech, and for expanding and demodulating received compressed signals. In a speech portion, an amplifier is provided in the speech unit 32 to vocalize the speech from the speaker 12 and amplify the speech signals input from the microphone 11.

The slave apparatus is provided with the charging apparatus 3 as an individual unit constituting by the cradle 38 for the slave apparatus and the DC power source 39 for the cradle as a power source for charging the battery 35 of the cordless slave apparatus 1 via the cradle 38 for the slave apparatus. Usually, the cordless slave apparatus 1 waits while being mounted on the cradle 38 for the slave apparatus. The quick communication function of the invention is the function of immediately setting a communication circuit to allow speech communications when a user picks up the cordless slave apparatus 1 from the cradle 38 for the slave apparatus in response to ringing tones. In this embodiment, the charging controller 36 detects interruption of power supply from the cradle 38 for the slave apparatus, and the control device 30 is notified of the pick-up. The control device 30 notifies the host apparatus 2 of the fact that the cordless slave apparatus 1 is picked up from the charging apparatus 3. Accordingly, the control device 30 functions as pick-up notification means.

The dial keys 13 and the operation keys 14 have substantially the same functions as those of the dial keys 23 and the operation keys 24 of the host apparatus 2, and are used for input operations of, for example, the telephone numbers by the user. The display apparatus 15 is a unit for displaying information or providing instructions to the user from the cordless slave apparatus 1. The display apparatus 15, and the dial keys 13 and the operation keys 14 are used to interactively input data, parameters, and the like.

Figure 3:
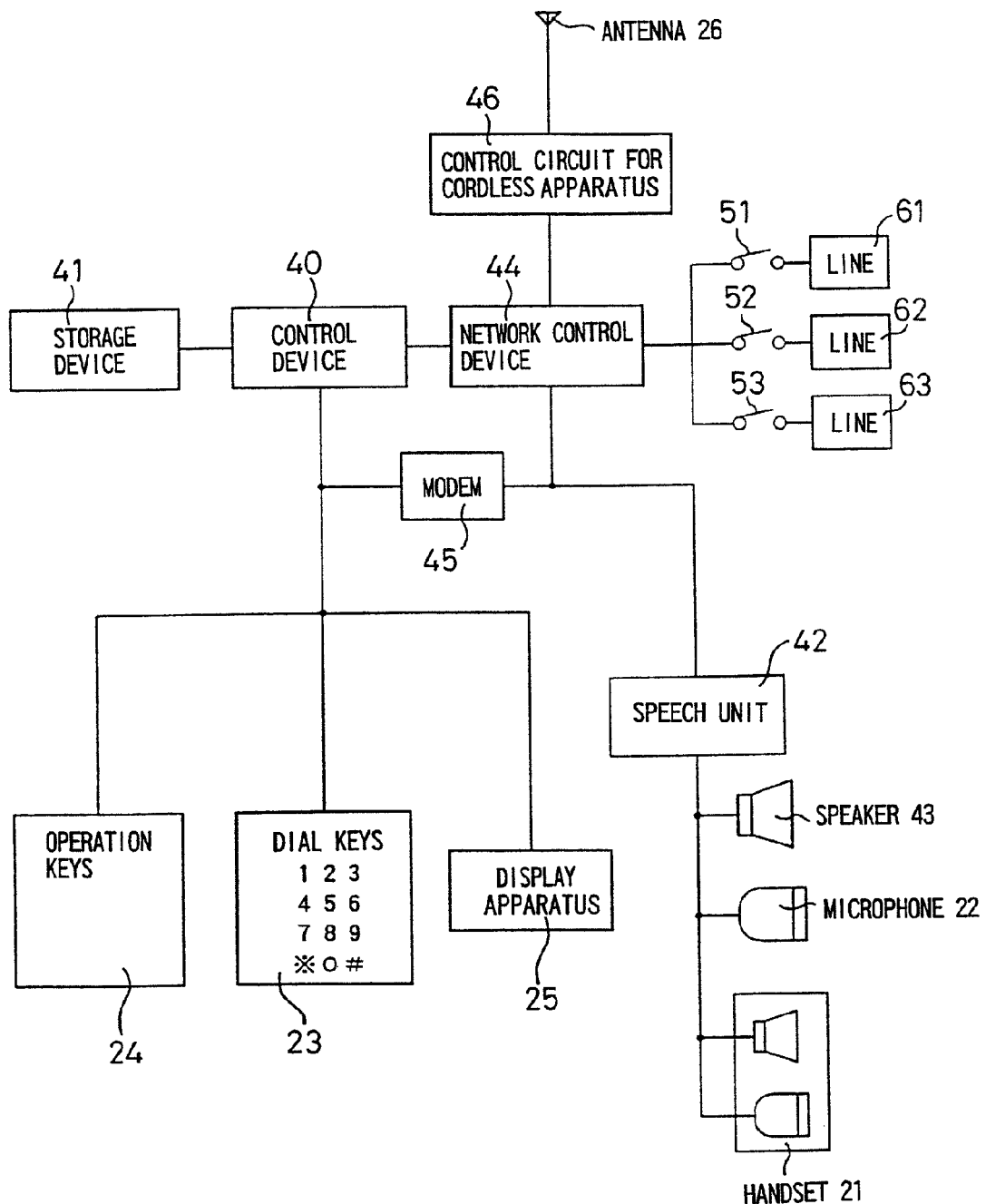
FIG. 3 is a block diagram schematically showing an electrical configuration of the host apparatus in FIG. 1C.

FIG. 3 schematically shows an electrical configuration of the host apparatus 2, which is the main body of the telephone. In addition to the handset 21, the microphone 22, the dial keys 23, the operation key 24, the display apparatus 25 and the antenna 26, the host apparatus 2 includes a control device 40, a storage device 41, a speech unit 42, a speaker 43, a network control device 44, a modem 45, a control circuit 46 for a cordless apparatus and a plurality of relays 51, 52 and 53. The network control device 44, the control circuit 46 for the cordless apparatus and the relays 51, 52 and 53 function as communication means. The relays 51, 52 and 53 can connect/disconnect a plurality of lines 61, 62 and 63 to/from the network control device 44, respectively. More specifically, the connections to a plurality of, for example, three lines 61 to 63 can be switched with the relays 51 to 53. The speaker 43 is arranged, for example, under the handset 21 in FIG. 1C, and used to output the sound of the ringing tones. Moreover, the speaker 43 is also used together with the microphone 22 to perform speech communications without using the handset 21, that is, to perform communications in a so-called hands-free state.

FIG. 3 shows the easiest method for connecting to a plurality of lines 61, 62 and 63. As described below, also there is a method for connecting the handset 21 in the main body and a plurality of cordless slave apparatuses 1 to a plurality of lines 61, 62 and 63 while switching them more flexibly, and this method can further improve the convenience for the user significantly. FIG. 3 illustrates the simplest connecting method. Although illustration is omitted in FIG. 3, the control device 40 is configured so as to be able to keep track of the states of all the lines 61, 62 and 63. The network control device 44 monitors the status of the lines 61, 62 and 63, and also switches the lines 61, 62 and 63 between the side of the speech unit 42 and the side of the control circuit 46 for a cordless apparatus. The modem 45 is provided for a caller display service and can read the number of a caller transmitted at 2400 bps.

The control device 40 determines the operation of the entire apparatus based on information such as input information from the operation keys 24 and the dial keys 23, information indicating the state from each of the units in the apparatus and signals from the lines 61 to 63, supplies commands to the entire apparatus, and further instructs the display apparatus 25 to display in cooperation with a program stored in the storage device 41. Further, the control device 40 functions as selection means, quick communication means, request detection means and line switching means. The operation keys 24 and the dials keys 23 are units with which the user inputs information and instructions to the apparatus.

The display apparatus 25 is a unit through which the telephone displays information and provides instructions to the user, and the various parameters of the telephone can be interactively set using this display apparatus 25, and the operation keys 24 and the dial keys 23. The speech unit 42 is an apparatus for amplifying speech signals and inputting/outputting speech with the handset 21 and/or the speaker 43 and the microphone 22.

The host apparatus 2 of this embodiment can be connected to one or a plurality of cordless slave apparatuses 1, and the control circuit 46 for a cordless apparatus is an apparatus for controlling communications with the cordless slave apparatuses 1. The control circuit 46 for a cordless apparatus includes, for example, a control portion for searching a communication path for a connection with the cordless slave apparatus 1, establishing the connection, and the like, a compander portion for compressing and reconstructing signals, a tuner for sending/receiving radio waves.

For example, when a request for communications with the cordless slave apparatus 1 comes from the control device 40, the control circuit 46 for a cordless apparatus performs carrier sensing on a control channel to check whether the control channel is available. In the case where the control channel is available for communications, this channel is used to, for example, transmit the ID signal of the host apparatus 2 and the ID signal of the slave apparatus 1, receive and confirm the ID signal from each of the cordless slave apparatuses 1, check open channels for communications, designate a communication channel and set a communication path, and the communication path to the cordless slave apparatus 1 is established. When the communications end, a process for ending the communications is performed. In this manner, the control circuit 46 for a cordless apparatus manages all the processes from the establishment of the communications with the cordless slave apparatus 1 to the completion of the communications. For the purpose of establishing the communication paths to a plurality of cordless slave apparatuses 1 simultaneously, the control circuit 46 for a cordless apparatus is usually provided with a plurality of tuners.

On the side of the cordless slave apparatus 1 shown in FIG. 2, the control device 30 keeps track of the operation state of each of the portions of the cordless slave apparatus 1 and supplies a command for operation to each of the units in cooperation with the control device 31. The control device 30 further communicates with the control circuit 46 for a cordless apparatus on the main body side closely, for example, to check the control channel that manages control of wireless communications with the host apparatus 2 of the main body of the telephone and the open channels among the communication channels, confirm the ID of the main body, and confirm and transmit the ID of the slave apparatus, so as to perform the processes that are necessary for establishing and disconnecting the communication path. That is to say, the control device 30 manages the control operation of the cordless slave apparatus 1 as a communication partner of the control circuit 46 for a cordless apparatus in the host apparatus 2.

In the storage device 31 of the cordless slave apparatus 1 and the storage device 41 of the host apparatus 2, for example, IDs, which are identification information, are stored. In the storage device 41 of the host apparatus 2, information concerning the lines 61 to 63 that are selected by the host apparatus 2 itself or each of the cordless slave apparatuses 1 are stored. The control device 40 of the host apparatus 2 determines whether or not a line that has received a call is selected by the cordless slave apparatus 1 based on the selection state stored in the storage device 41.

Figure 4:
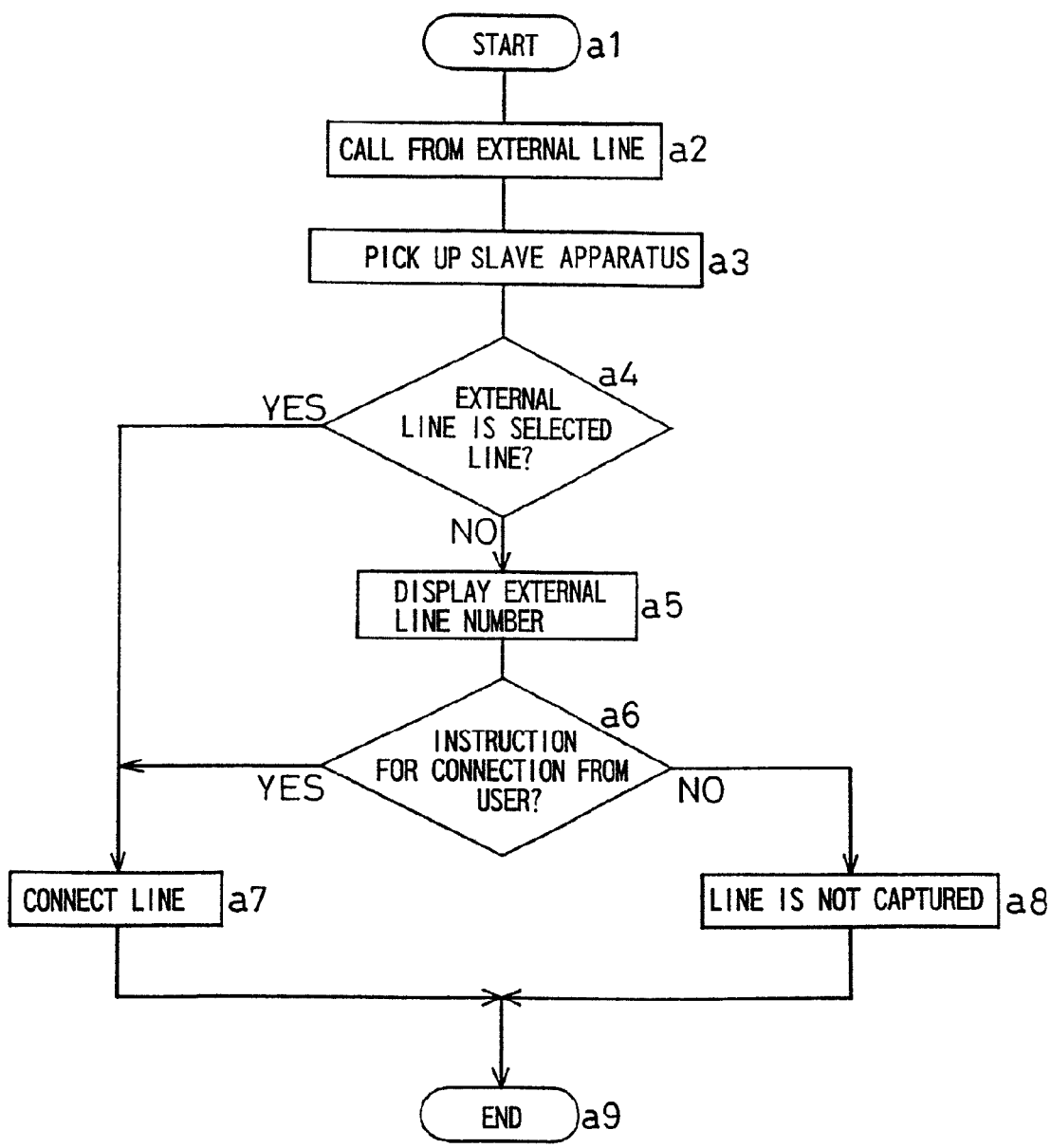
FIG. 4 is a flowchart showing a process when the cordless slave apparatus is picked up in response to a call from an external line in the telephone communication apparatus in FIGS. 1A to 1C.

FIG. 4 shows a processing method at the time of picking up the cordless slave apparatus 1 in response to a call from an external line. This flow starts from step a1, then, at step a2, a call (arriving call) arrives at an external line that is any one of a plurality of lines 61, 62 and 63. As described above, the control device 40 of the host apparatus 2 constantly monitors the states of the lines 61 to 63. In response to this call, at step a3, the user picks up the cordless slave apparatus 1 from the charging apparatus 3. Then, at step a4, it is checked whether or not the external line at which the call has arrived is a line that has been selected by this cordless slave apparatus 1. In the case where the determination at step a4 is "NO," a connection to the line is not immediately established, and at step a5, the number of the line at which the call has arrived is displayed on the display apparatus 15 of the cordless slave apparatus 1 that is picked up. In response to this display, when the user provides an instruction for connection with the operation keys 14 at step a6, then the procedure goes to step a7.

Also in the case where the determination at step a4 is "YES," the procedure goes to step a7. At step a7, one of the relays 51 to 53 that corresponds to the line 61, 62 or 63 at which the call has arrived is closed immediately to receive the call and establish a communication circuit. The user can start speech communications by the quick communication function using the cordless slave apparatus 1 that is picked up. In the case where the determination at step a6 is "NO," at step a8, the line is not captured and responses at the other cordless slave apparatuses 1, the host apparatus 2 or the like are waited for. The determination at step a6 is "NO," for example, when the user does not provide an instruction for connection even after a predetermined period of time has passed. After the process of step a7 or step a8, this flow ends at step a9.

Figure 5:
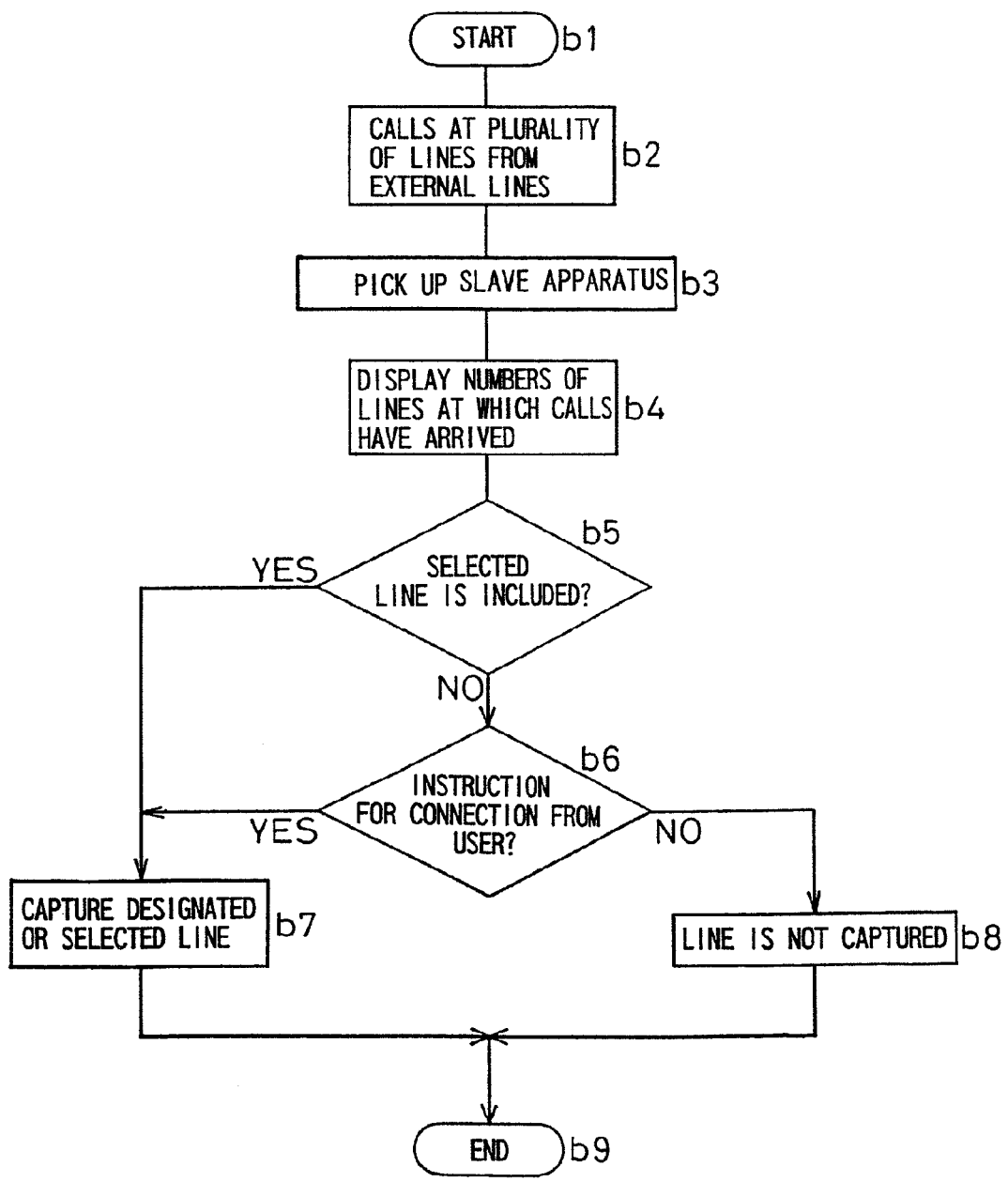
FIG. 5 is a flowchart showing a process when calls have arrived from a plurality of lines at the same time in the telephone communication apparatus in FIGS. 1A to 1C.

FIG. 5 shows a flow of a process in the case where calls have arrived at a plurality of lines simultaneously. This flow is applied to the case where, after starting from step b1 and before establishing a connection for a call, a plurality of calls occur from the external lines at step b2. When ringing tones are reproduced from the speaker 12 and the user picks up the cordless slave apparatus 1 from the charging apparatus 3 at step b3, the control device 30 recognizes a plurality of lines 61, 62 and 63 at which the calls have arrived, and the numbers of these lines are displayed on the display apparatus 15 at step b4. In the case where the line that has been selected by the cordless slave apparatus 1 is not included in these lines, the determination at step b5 is "NO," and the procedure goes to step b6. At step b6, it is waited for the user to provide an instruction for connection with the operation keys 14 for a predetermined period of time. Although no call arrives at the line that has been selected by the cordless slave apparatus 1, the lines at which the calls have arrived are displayed on the display apparatus 15 at step b4, so that when the user provides the instruction for connection with the operation keys 14, the procedure goes to step b7.

In the case where the determination at step b5 is "YES," or in the case where the user provides an instruction for connection at step b6, at step b7, the line is captured immediately and a connection is established to allow communications. Here, even in the case where there is a call in a line and the line is captured immediately, it is necessary to display the lines at which calls have arrived in order to inform the user of the fact that there are also calls in other lines. In the case where the determination at step b6 is "NO," the line is not captured and waits for another cordless slave apparatus 1, the host apparatus 2 or the like to answer the call. After step b7 or step b8, this flow ends at step b9.

Figure 6:
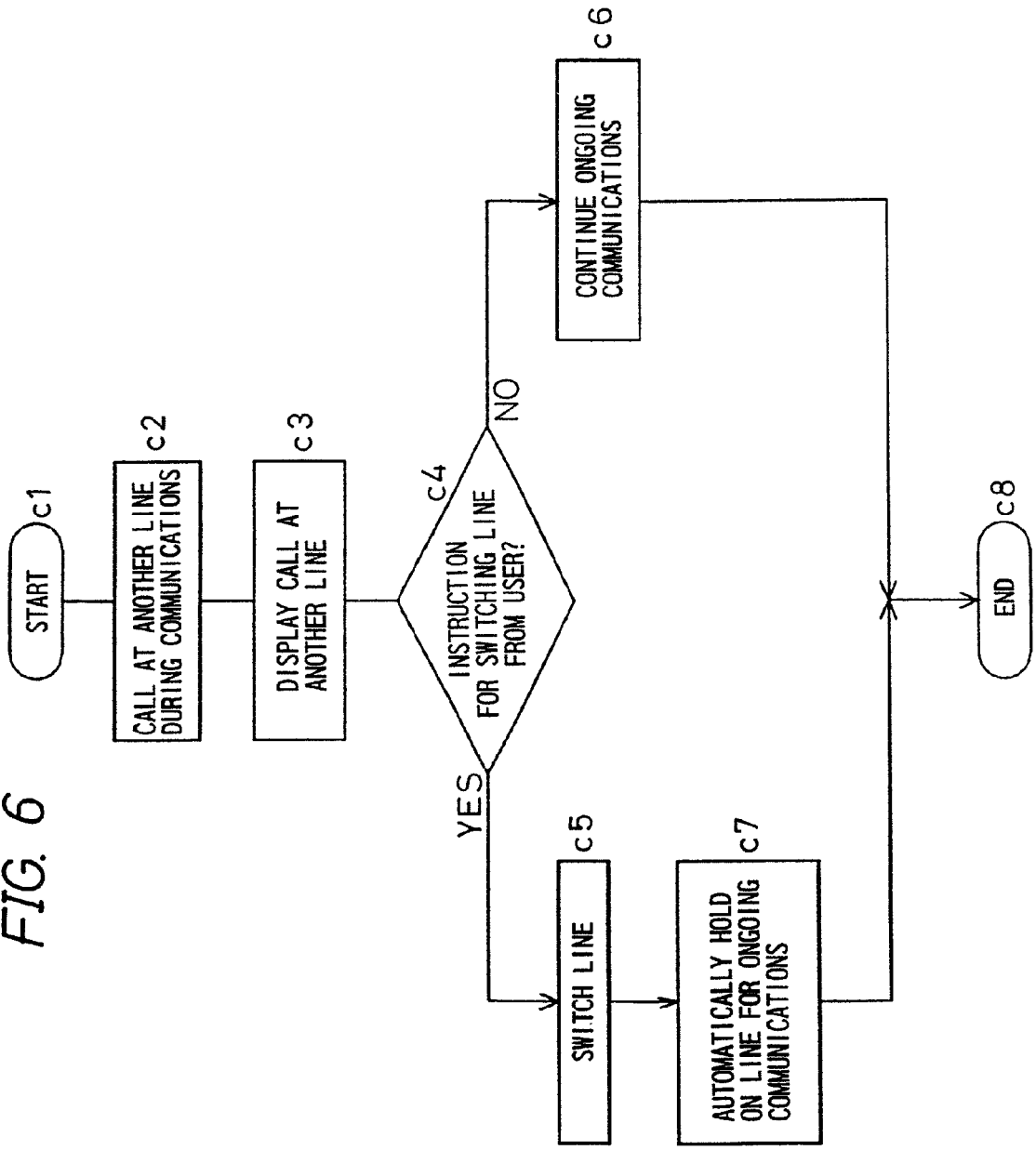
FIG. 6 is a flowchart showing a process when a call has arrived from another line during communications in the telephone communication apparatus in FIGS. 1A to 1C.

FIG. 6 shows a flow in the case where another call occurs during communications. This proceeding is not limited to the case where the cordless slave apparatus 1 is picked up, and applied to all the operations for receiving calls. This flow starts from step c1, and at step c2, a call signal arrives at another line during communications. Even when the line at which a call has arrived is a line that has been selected, it is necessary to give notice to the other party of the communications before switching, so that the connection cannot be switched immediately. Therefore, at step c3, the number of the line at which the call has arrived is displayed and an instruction of the user is waited for. The display is performed on the display apparatus of a communication unit that is communicating. For example, when the communications are being performed over the host apparatus 2, the display is performed on the display apparatus 25 of the host apparatus 2, and when the communications are being performed over the cordless slave apparatus 1, the display is performed on the display apparatus 15 of the cordless slave apparatus 1. In the case where the line at which a call has arrived is the line that has been selected by the communication unit, it is desirable to indicate this fact clearly on the display.

When the user supplies an instruction for switching the line at step c4, the line is switched at step c5. When an instruction for switching the line is not supplied from the user for a predetermined period of time at step c4, the communications that have been performed are continued at step c6. When the switching of the line is performed at step c5, the line through which the communications have been performed is automatically turned to be in an on-hold state at step c7. To the line that is in the on-hold state, for example, on-hold tones are supplied to notify the other party of the communications that have been performed of the fact that the line is in the on-hold state. At step c8, this flow ends.

The lines 61 to 63 that can be used in the invention are not limited to voice-grade lines for wired communications and include also a method for adding lines by superimposing a high frequency on a telephone line and a communication path for performing wireless communications with, for example, radio waves or infrared rays. That is to say, the plurality of lines 61 to 63 can include an ordinary telephone line and a HomePNA line, which is a communication line formed by superimposing a high-frequency signal on this telephone line, and therefore a plurality of lines can be realized using an existing telephone line. Furthermore, also a wireless communication line such as Bluetooth can be included. However, in order to input/output high-frequency signals or wireless signals, not only the relays 51, 52 and 53 but also a unit for a corresponding interface can be provided. Furthermore, an optical fiber line also can be connected.

Moreover, possible methods for determining a line that is to be selected by a communication unit such as the cordless slave apparatus 1 and the host apparatus 2 include a method for automatically assigning in a preset order every time the host apparatus 1 recognizes the cordless slave apparatus 1, a method for assigning in accordance with an instruction of the user, and a method for designating a line through which communications have been performed most recently. Furthermore, it is also possible to configure such that these selection methods can be changed by the user.

FIG. 7 illustrates a concept regarding switching of a line to be selected as another embodiment of the invention. In this embodiment, it is assumed that when a call has arrived, a choice as shown by an arrow moves to a line at which the call has arrived. As shown in (a) of FIG. 7, when there are two lines of LINE 1 and LINE 2 and a call has arrived at the LINE 1 while the LINE 2 is selected, a choice also moves to the LINE 1 as shown in (b) of FIG. 7. When ringing tones (RING) sound in the LINE 1 and a call is answered by pressing, for example, a TALK key, then communications are performed as shown in (c) of FIG. 7.

In the case where communications are not performed in (b) of FIG. 7, the choice moves back to the LINE 2, which is the line that has been selected before the call arrives, as shown in (d) of FIG. 7. In the case where communications are performed as shown in (c) of FIG. 7, the line selection state remains as shown in (e) of FIG. 7.

Moreover, instead of the procedure shown in (e) of FIG. 7, it is also possible to move the choice back to the line that is set for the telephone in a fixed manner.

What is claimed is:

1. A telephone communication apparatus that can be connected to a plurality of communications paths having a plurality of lines, comprising:
   a host unit;
   a plurality of slave terminals; and
   a line selection means,
   wherein each slave terminal is assigned a selected line by the line selection means, whereby calls from both the selected lines and non-selected lines are processed by each slave terminal in a different manner in terms of capturing lines for communication,
   wherein when a line at which a call arrives is the selected line, the call is processed by a slave terminal assigned to the selected line without a holding state, and when a line at which a call arrives is a line other than the selected line, the call is processed by a slave terminal assigned to the line other than the selected line after a holding state without establishing line connection.

2. A telephone communication apparatus that can be connected to a plurality of communications paths having a plurality of lines, comprising:
   a host unit;
   a plurality of slave terminals; and
   a line selection means,
   wherein each slave terminal is assigned a selected line by the line selection means, whereby calls from both the selected lines and non-selected liens are processed by each slave terminal in a different manner in terms of capturing lines for communication,
   wherein when a line at which a call arrives is the selected line, the call is processed by a slave terminal assigned to the selected line without a holding state, and when a line at which a call arrives is a line other than the selected line, the call is processed by a slave terminal which is assigned to the line other than the selected line and from which an instruction for line connection is provided.

* * * * *